United States Patent [19]
Hales

[11] Patent Number: 5,701,655
[45] Date of Patent: Dec. 30, 1997

[54] METHOD AND APPARATUS FOR MAKING BRAKE SHOES

[75] Inventor: Eric Charles Hales, Solihull, United Kingdom

[73] Assignee: Automotive Products, plc, Leamington Spa, England

[21] Appl. No.: 505,317

[22] PCT Filed: Dec. 22, 1994

[86] PCT No.: PCT/GB94/02809

§ 371 Date: Aug. 17, 1995

§ 102(e) Date: Aug. 17, 1995

[87] PCT Pub. No.: WO95/17613

PCT Pub. Date: Jun. 29, 1995

[30] Foreign Application Priority Data

Dec. 22, 1993 [GB] United Kingdom ............... 93262004

[51] Int. Cl.⁶ ............... B21D 53/34; F16D 65/08
[52] U.S. Cl. ............... 29/513; 29/514; 29/788; 29/796; 29/233; 29/243.5; 72/172; 72/179; 188/251 R

[58] Field of Search ............ 29/445, 513, 514, 29/522.1, 524.1, 783, 788, 796, 233, 243.5; 72/130, 166, 167, 170, 171, 172, 173, 174, 175, 179, 182; 188/251 R, 250 B

[56] References Cited

U.S. PATENT DOCUMENTS

| | | | |
|---|---|---|---|
| 3,540,395 | 11/1970 | Skinner | 72/129 |
| 4,531,276 | 7/1985 | Warwick et al. | 29/417 |
| 4,688,414 | 8/1987 | Mugica | 72/167 |
| 5,440,796 | 8/1995 | Deggau et al. | 29/412 |

*Primary Examiner*—Timothy V. Eley
*Attorney, Agent, or Firm*—Paul E. Milliken; Lee A. Germain

[57] ABSTRACT

A method and apparatus for producing an arcuate brake shoe from a first strip of material which is to provide a web of the shoe and has a plurality of projections extending from one edge and a second strip which has a plurality of corresponding openings to receive the projections and which is to provide the platform of the shoe. The two strips are secured together with projections and openings engaged and formed into an arcuate shape by passage through a roller arrangement.

17 Claims, 3 Drawing Sheets

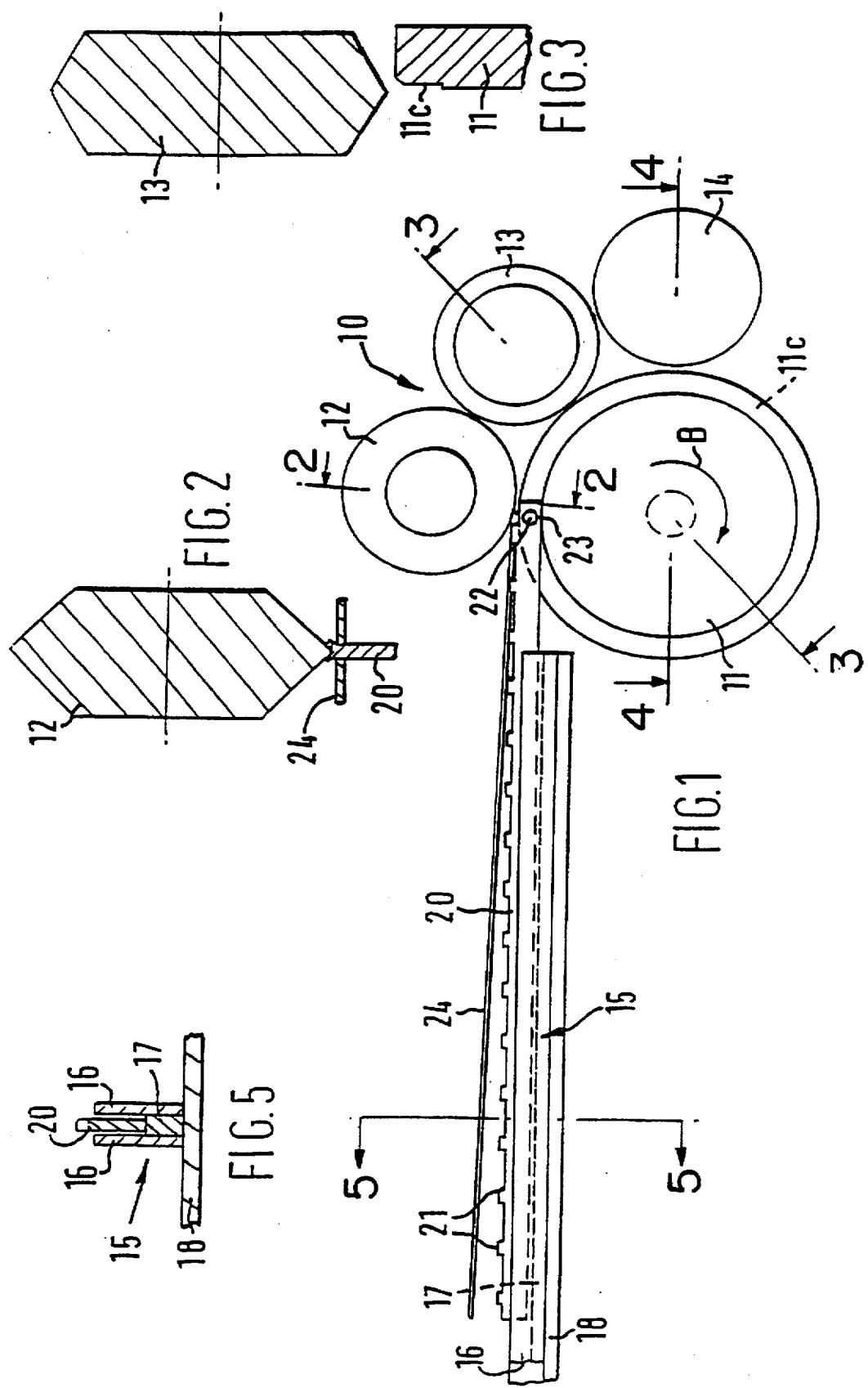

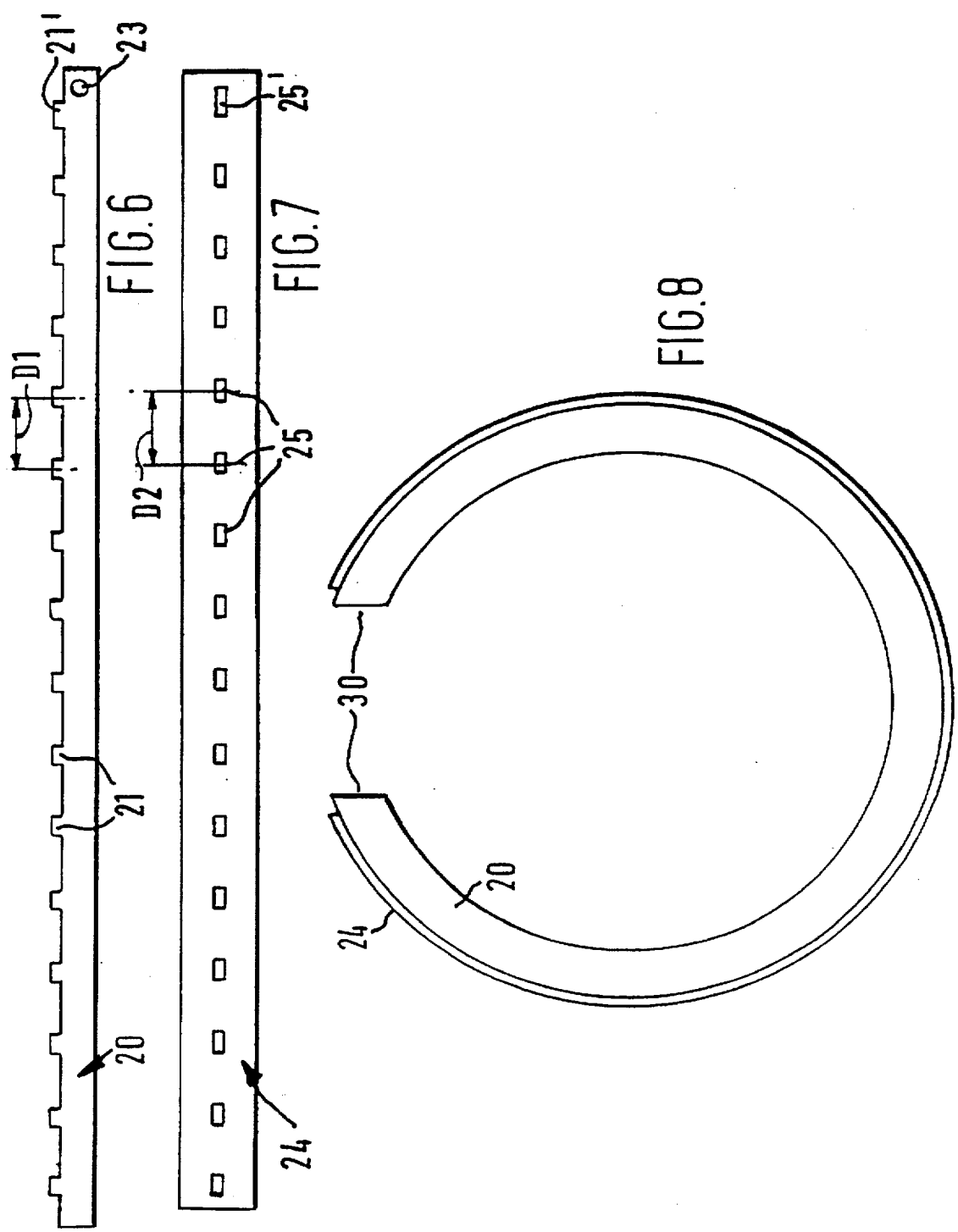

METHOD AND APPARATUS FOR MAKING BRAKE SHOES

FIELD OF THE INVENTION

This invention relates to brake shoes and in particular to a method and apparatus for producing arcuate brake shoes.

It is an object of the present invention to provide a low cost method for the manufacture of arcuate brake shoes which is particularly suitable for the manufacture of the long arcuate shoes used in single shoe brakes.

SUMMARY OF THE INVENTION

Thus according to the present invention there is provided a method of producing an arcuate brake shoe comprising the steps of taking a first strip of material which is to provide a web of the shoe and has a plurality of projections extending from one edge, taking a second strip which has a plurality of corresponding openings to receive the projections and which is to provide the platform of the shoe, securing the strips together with projections and openings engaged and forming the strips longitudinally to an arcuate form.

Preferably the method comprises securing and forming the strips by passing the strips through a roller arrangement. This roller arrangement preferably comprises a central roller and a number of satellite rollers circumferentially spaced around and co-acting with the central roller.

The central roller is preferably grooved circumferentially to receive the first strip standing on its other edge with the projections extending radially outwardly from the central roller.

The central roller may be split in two portions in a plane transverse to its axis of rotation and the first strip is received on its other edge in a groove formed between the roller portions.

A first satellite roller deforms the projections on the first strip as they appear through the corresponding openings in the second strip to secure the strips together and the subsequent satellite rollers deform the projections further till the projections are flush with the surface of the second strip.

The first strip is positively located relative to the central roller during the securing and forming of the two strips by a locating formation on the central roller which passes through an aperture in an end portion of the first strip.

The strips are preferably automatically assembled by manipulators which locate the first strip on its other edge in a guide track which feeds the roller arrangement and which locate the second strip on the first strip so that the projections and openings can engage prior to entry into the roller arrangement.

The method of the present invention is particularly suitable for the production of arcuate brake shoes for use in single shoe brakes. Such shoes are almost a complete circle and are operated by a brake actuator which is in the gap between the opposed ends of the shoe.

The method of the present invention is also suitable for the manufacture of conventional brake shoes for use in any conventional twin shoe brake.

The present invention also provides an apparatus for the production of an arcuate brake shoe from a first strip of material which is to provide a web of the shoe and has a plurality of projections extending from one edge and a second strip which has a plurality of corresponding openings to receive the projections and which is to provide the platform of the shoe, said apparatus comprising means securing the strips together with projections and openings engaged and for forming the strips longitudinally to arcuate form.

BRIEF DESCRIPTION OF THE DRAWINGS

The present invention will now be described, by way of example only, with reference to the accompanying drawings in which:

FIG. 1 is a diagrammatic view of an apparatus in accordance with the present invention for producing an arcuate brake shoe;

FIGS. 2, 3, 4 and 5 are cross sectional views taken on lines 2—2, 3—3, 4—4, and 5—5 of FIG. 1 respectively;

FIGS. 6 and 7 show side and plan views respectively of first and second steel strips used in the apparatus of FIGS. 1 to 5, and FIG. 8 shows a diagrammatic side view of an arcuate brake shoe manufactured in the apparatus of FIGS. 1 to 5.

DESCRIPTION OF PREFERRED EMBODIMENTS

Figure 4:
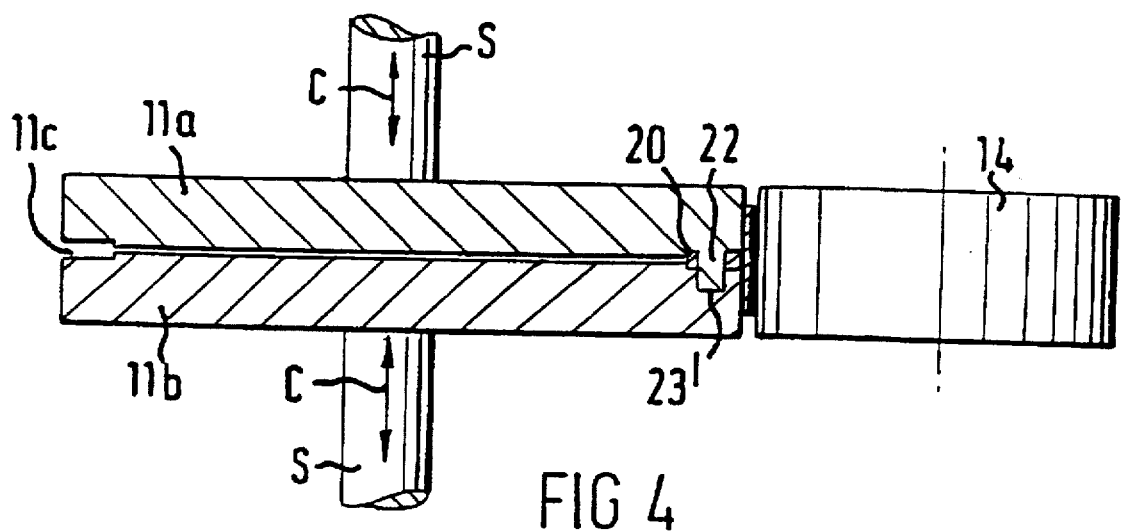

Referring to FIG. 1 the brake shoe manufacturing apparatus essentially comprises a roller arrangement 10 comprising a two-piece central roller 11 and three satellite rollers 12, 13 and 14 respectively. The satellite rollers are circumferentially spaced around and co-act with the central roller 11.

The apparatus also includes a guide track 15 in the form of two side rails 16 and a base strip 17 supported on a table 18.

Essentially the method of manufacture in accordance with the present invention consists of taking a first steel strip 20 which is to form the web of the shoe (see FIG. 6) having a series of longitudinally spaced projections 21 along one edge and placing this first steel strip vertically upright between the side rails 16 of guide track 15. Steel strip 20 is connected with the central roller 11 by a pin 22 on roller half 11a and which pin 22 passes through a corresponding hole 23 provided in the end of strip 20 and extends into an aligned hole 23' in the other roller half 11b (see FIGS. 1 and 4) so that when the central roller is rotated clockwise (see arrow B of FIG. 1) the strip 20 is drawn in between the central roller and the satellite rollers. The roller halves 11a and 11b are axially movable with their associated drive shafts S as indicated by arrows C in FIG. 4 to engage pin 22 with holes 23,23' to draw in strip 20.

Typically the strip 20 has a thickness in the range 2.95–3.05 mm and width to the top of the projections 21 of 14.4–14.6 mm. The distance D1 (see FIG. 6) between the centres of adjacent projections 21 is typically 26.25 mm with the projections 21 being nominally 3 m×7 mm. The first projection 21' is longer being nominally 3 mm×10 mm.

Prior to commencement of the rotation of the central roller, a second steel strip 24 which is to form the shoe table (see FIG. 7) having a series of longitudinally spaced openings 25 is positioned on top of the first strip 20 so that the first longer projections 21' engage a corresponding longer first opening 25'. The two strips are then drawn in between the central roller and satellite rollers by rotation of the central roller.

Typically the strip 24 has a thickness in the range 1.5–1.7 mm with a width in the range 24.75–25.25 mm. The distance D2 (see FIG. 7) between the centres of adjacent openings 25 is typically 28.81 mm with the openings being 3.5×7.6 mm mean. The first longer opening 25' is 3.5×10.6 mm mean.

The difference in the distances D1 and D2 between the centres of the openings and projections allows for a stretch of approx 9.75% in the radially outer regions of strip 21 as it is formed in roller arrangement 10.

The location of the first strip 20 in the guide track 15 and the positioning of the second strip 24 on top of the first strip is accomplished automatically using any suitable form of manipulator (e.g. hydraulically or pneumatically operated rams and grabs) which picks up each strip from a stockpile of like strips.

The cross section of the satellite rollers 12, 13, 14 and central roller is shown on an increased scale in FIGS. 2, 3 and 4 respectively. The central roller 11 of the two halves 11a and 11b co-operate to form a circumferentially extending groove 11c which supports the first strip 20 on its edge as it travels around the roller arrangement.

As can be seen from FIG. 2, the first satellite roller 12 is of a sharp V-configuration such that when the strips 20 and 24 pass between the central roller 11 and the satellite roller 12 those portions of the projections 21 which project through the openings 25 are split to commence roll-riveting of the two strips 20 and 24 together. As these strips pass between the second satellite roller 13 and the central roller the split portions of the projections 21 are further separated and flattened, culminating in the complete flattening of the projecting portions of the projections as the strips pass between the third satellite roller 14 and the central roller 11.

The pressure developed during the rolling process is such that the metal strip regions surrounding openings 25 are locally deformed to form countersink areas into which the ends of the projections which extend through the openings 25 are formed. Thus when the strips exit between the third satellite roller 14 and the central roller 11 the outer ends of the projections 21 are flush with the outer surface of strip 24 to produce a flat brake shoe table. Experience has shown that the width of the rivet head finally formed is approximately twice the initial width of strip 20.

To release the finish brake shoe from roller 11 the two roller halves 11a and 11b are moved apart sufficiently to discharge pin 22 from holes 23 and 23' and also sufficiently to allow the brake shoe to pass between the roller halves.

The roller arrangement described above is set up to manufacture an arcuate brake shoe of the form shown in FIG. 8 which is for use in a drum brake having a single brake shoe which employs a brake operating mechanism disposed in the gap 30 between the opposed ends of the shoe. As can be seen from FIG. 8, the strip 20 forms the web of the shoe and the strip 24 the table.

As will be appreciated, although the invention has been described above in relation to the manufacture of a long arcuate brake shoe for use in a single shoe brake it is also applicable, by using shorter length strips 20 and 24, to the manufacture of standard arcuate brake shoes for use in twin shoe brakes.

The present invention provides a simple apparatus and method for the manufacture of arcuate brake shoes from inexpensive steel strip material with the minimum of forming operations.

I claim:

1. A method of producing an arcuate brake shoe comprising the steps of taking a first generally straight strip of material which is to provide a web of the shoe and has a plurality of projections extending from one edge, taking a second generally straight strip which has a plurality of corresponding openings to receive the projections and which is to provide a platform of the shoe, securing the strips together with the projections inserted through the openings and forming both the strips longitudinally from their generally straight form to an arcuate form.

2. A method as claimed in claim 1 comprising securing and forming the strips by passing the strips through a roller arrangement.

3. A method as claimed in claim 2 comprising passing the strips between a central roller and a number of satellite rollers circumferential spaced around and co-acting with the central roller to form said roller arrangement.

4. A method as claimed in claim 3, wherein the central roller is grooved circumferentially to receive the first strip with the projections extending radially outwardly from the central roller.

5. A method according to claim 4 wherein the central roller is split in two portions in a plane transverse to its axis of rotation and the first strip is received on its other edge in a groove formed between the roller portions.

6. A method according to claim 5, wherein the roller portions are moved axially towards each other to locate the first strip between the roller portions during the securing and forming steps and axially away from each other when production of the shoe is complete to allow the shoe to disengage the roller arrangement by passing between the roller portions.

7. A method as claimed in any one of claim 4 wherein the strips are assembled by manipulators which locate the first strip on its other edge in a guide track which feeds the roller arrangement and which locate the second strip on the first strip so that the projections can be inserted through the openings prior to entry into the roller arrangement.

8. A method as claimed in any one of claim 3 wherein a first satellite roller deforms the projections on the first strip as they appear through the corresponding openings in the second strip to secure the strips together and a subsequent satellite roller deforms the projections further until the projections are flush with the surface of the second strip which contacts the satellite rollers.

9. A method as claimed in claim 3 wherein the first strip is positively located relative to the central roller during the securing and forming of the two strips by a locating formation on the central roller which passes through an aperture in an end portion of the first strip.

10. A method as claimed in claim 1 in which the spacing between adjacent openings in the second strip is larger than the spacing between adjacent projections in the first strip to take into account stretching of the radially outer regions of the first strip during forming to its arcuate form.

11. Apparatus for producing an arcuate brake shoe from a first generally straight strip of material which is to provide a web of the shoe and has a plurality of projections extending from one edge and a separate second generally straight strip which has a plurality of corresponding openings to receive the projections and which is to provide a platform of the shoe, said apparatus comprising a roller arrangement for occuring the strips together with the projections inserted through the openings and for forming both the strips longitudinally from their generally straight form to an arcuate form, the roller arrangement comprising a central roller and a number of satellite rollers circumferentially spaced around and co-acting with the central roller, the strips being passed between the central roller and the satellite rollers.

12. Apparatus as claimed in claim 11 wherein the central roller is grooved circumferentially to receive the first strip standing on its other edge with the projections extending radially inwardly from the central roller.

13. Apparatus according to claim 12 wherein the central roller is split in two portions in a plane transverse to its axis of rotation and the first strip is received on its other edge in a groove formed between the roller portions.

14. Apparatus according to claim 13, wherein means are provided for moving the roller portions axially towards each other to locate the first strip between the roller portions during the securing and forming steps and for moving the roller portions axially away from each other when production of the shoe is complete to allow the shoe to disengage the roller arrangement by passing between the roller portions.

15. Apparatus as claimed in claim 12 wherein a guide track is provided to feed the first strip to the roller arrangement and manipulators are provided for locating the first strip in the guide track and for locating the second strip on the first strip so that the projections can be inserted through the openings prior to entry into the roller arrangement.

16. Apparatus as claim in claim 11 wherein a first satellite roller deforms the projections on the first strip as they appear through the corresponding openings in the second strip and a subsequent satellite roller deforms the projections further until the projections are flush with the surface of the second strip which contacts the satellite rollers.

17. Apparatus as claimed in claim 11 wherein the central roller is provided with a locating formation which also passes through an aperture in an end portion of the first strip to positively locate the first strip relative to the central roller during the securing and forming of the two strips.

* * * * *